United States Patent
Zandian et al.

(10) Patent No.: US 12,513,872 B2
(45) Date of Patent: Dec. 30, 2025

(54) ARTIFICIAL REALITY DEVICE ACCESSORIES TO INCREASE THERMAL BUDGET

(71) Applicant: Meta Platforms Technologies, LLC, Menlo Park, CA (US)

(72) Inventors: Bardia Zandian, Redwood City, CA (US); Alex Ockfen, Bothell, WA (US); Pankaj Raghuvanshi, San Jose, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 277 days.

(21) Appl. No.: 18/306,887

(22) Filed: Apr. 25, 2023

(65) Prior Publication Data
US 2024/0015938 A1    Jan. 11, 2024

Related U.S. Application Data

(60) Provisional application No. 63/388,103, filed on Jul. 11, 2022.

(51) Int. Cl.
*H05K 7/20* (2006.01)
*G02B 27/01* (2006.01)

(52) U.S. Cl.
CPC ....... *H05K 7/20963* (2013.01); *G02B 27/017* (2013.01); *G02B 2027/0178* (2013.01)

(58) Field of Classification Search
None
See application file for complete search history.

(56) References Cited

U.S. PATENT DOCUMENTS

| 7,308,008 B2 | 12/2007 | Freeman et al. |
| 9,652,005 B2 | 5/2017 | Saeidi et al. |
| 10,659,869 B1 * | 5/2020 | Bobuk ............... G02B 27/0176 |
| 10,873,800 B1 * | 12/2020 | Khaleghimeybodi .. H04S 7/304 |
| 11,039,651 B1 * | 6/2021 | Bosworth ............... H04S 7/303 |
| 11,076,510 B2 | 7/2021 | Stellman |
| 11,740,313 B2 * | 8/2023 | Brown .................... G06T 17/10 |
| | | 345/633 |

(Continued)

FOREIGN PATENT DOCUMENTS

| CN | 117406451 A * | 1/2024 | ........... G02B 27/017 |
| CN | 220438675 U * | 2/2024 | |
| WO | 2019073426 A1 | 4/2019 | |

OTHER PUBLICATIONS

Amazon, "USB Mobile Phone Cooler, 3-in-1 Portable Fast Mobile Phone Cooling Fan Bracket Battery Box, with 1000 mA Emergency Mobile Power Support for Apple Other Mobile Phones (Black, Wireless Charging)," Jul. 19, 2018, 3 pages.

(Continued)

*Primary Examiner* — Xanthia C Relford
(74) *Attorney, Agent, or Firm* — Morgan, Lewis & Bockius LLP (57) ABSTRACT

An artificial reality device has a component, which component is configured to enable a visual associated with artificial reality programs to a user, as well as at least one heat source and a contact point. The contact point is specially configured to accommodate an accessory, which accessory is specially configured to extend the thermal headroom of the artificial reality device.

20 Claims, 8 Drawing Sheets

(56) References Cited

U.S. PATENT DOCUMENTS

| | | | | |
|---|---|---|---|---|
| 2016/0255748 | A1* | 9/2016 | Kim | G02B 27/0006 |
| | | | | 361/695 |
| 2017/0184863 | A1* | 6/2017 | Balachandreswaran | |
| | | | | G02B 27/0176 |
| 2018/0239131 | A1* | 8/2018 | Cornelius | G02B 27/0006 |
| 2021/0157154 | A1* | 5/2021 | Ding | G02B 27/0176 |
| 2022/0398986 | A1* | 12/2022 | DeWall | G06F 3/147 |
| 2023/0122743 | A1* | 4/2023 | Lee | G02C 11/10 |
| | | | | 361/707 |
| 2023/0194899 | A1* | 6/2023 | Su | G02C 5/14 |
| | | | | 351/111 |

OTHER PUBLICATIONS

Starner; et al., "A Heat Dissipation Tutorial for Wearable Computers," Digest of Papers. Second International Symposium on Wearable Computers (Cat. No. 98EX215), Oct. 19-20, 1998, 9 pages.

Amazon, USB Mobile Phone Cooler, 3-in-1 Portable Fast Mobile Phone Cooling Fan Bracket Battery Box, with 1000 mA Emergency Mobile Power Support for Applie Other Mobile Phones (Black, Wireless Charging), Amazon.com,, date first available Jul. 19, 2018, 3 pgs.

Starner et al., A Heat Dissipation Tutorial for Wearable Computers, authorized licensed use limited to: John Wootress, downloaded on Jan. 15, 2022 from IEEE Xplore, 9 pgs.

* cited by examiner

ARTIFICIAL REALITY DEVICE ACCESSORIES TO INCREASE THERMAL BUDGET

PRIORITY

This application claims the benefit under 35 U.S.C. § 119(e) of U.S. Provisional Patent Application No. 63/388,103, filed 11 Jul. 2022, which is incorporated herein by reference.

TECHNICAL FIELD

This disclosure generally relates to devices that use accessories to dissipate heat generated by a computing device and received from other sources.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Any computing device—such as a smartphone, tablet computer, or laptop computer—naturally generates thermal energy, or heat, as it consumes power. This is true for any computing platform or computing device that can be used to implement an artificial reality system. The amount of heat generated can increase for a variety of reasons, including a user running multiple or too many applications on the computing device or a user running one or more applications for long periods of time. Increased heat generation by the computing device can lead to overheating of the computing device. Likewise, environmental factors, such as exposure to direct sunlight (solar load) or use in an otherwise hot environment (ambient temperature) can lead to overheating of the computing device. In some instances, overheating can cause a temporary reduction in functionality, such as a lowering of processing speed and/or an inability to remain powered on. In the same or other instances, overheating can cause permanent damage to device components and/or degrade product reliability.

Since varying ambient temperature and solar load conditions significantly change a device's Thermal Design Power (TDP), there are inevitably operation environments (e.g., outdoors in the sun) where the device won't have enough thermal headroom to run many desired use cases or to run them for long periods of time. The TDP is the heat generation that can be sustained within the product without reaching a temperature constraint, which temperature constraint may be, e.g., junction temperature, reliability limit, comfort limit, etc. In other words, the device may cease to function properly due to overheating caused by some environments. TDP limits the sustained power consumption of a computing device because power consumption above the TDP limit may result in the device violating comfort, reliability or compliance thermal limits. For example, when the device reaches a certain temperature, it will be too hot to be comfortable against a user's head. This limited TDP is dictated by existing device design (e.g. limited surface area and coefficient of thermal spreading (CTS)).

An artificial-reality device (e.g., augmented-reality device, virtual-reality device, or mixed-reality device) may include one or more components. As an example and not by way of limitation, an AR device may be a standalone system (i.e., all the computational resources is embodied within a head-mounted display) or a multi-component system where computation is distributed between multiple distinct devices that the user can carry or wear. A multi-component system, for example, may include a pair of AR glasses or a head mounted display (HMD) and a stage compute device, e.g., a mobile computer that is portable and configured to help the HMD with workloads. The HMD may be communicatively coupled to the stage computing device. The stage computing device, which may be placed in the user's backpack or pocket, does not have as stringent of a form factor as that of the HMD. Thus, the stage computing device could be equipped with more battery and computational resources than the HMD. Such a multi-component system would be particularly useful in the AR context since power and computer is extremely limited on the HMD. Each of the computational components of an artificial-reality device (e.g., the HMD, the stage computing device, or both) dissipates heat and has a thermal limit. As such, each computational component could benefit from the present disclosure to dissipate heat via accessories. Throughout this disclosure, HMD is used as an example, but the heat-dissipation concepts described herein can be equally applicable to other components of an AR device. For example, a stage computing device may equally have need to improve heat dissipation as it, like an HMD, may contain one or more processors that generate heat, such as a computer. Similar to the HMD examples provided below, a stage computing device may be equipped with one or more contact points to connect with accessories, one or more heat paths to direct thermal energy to the contact points and/or the surface of the stage, and/or one or more switches to direct heat paths. For example, if a user wishes to put the stage computing device in a backpack, the user could thermally connect the stage computing device to a heat-dissipation accessory that can be placed on the exterior of the backpack (e.g., the accessory could be a cylinder shaped like a water bottle or soda can and placed in the backpack's beverage-holding pocket). One of ordinary skill in the art would appreciate that other examples and use cases would also be possible without deviating from the concepts described herein.

Disclosed systems provide an artificial reality device, including but not limited to a head mounted display (HMD) associated with an artificial reality system, wherein the head mounted display is configured to accommodate accessories, which accessories are particularly configured to increase the thermal design power (TDP) of the HMD. This accommodation is done through use of contact points, which may represent a thermal contact feature. These contact points are designed to pass on thermal energy to the accessories with minimal leakage to the HMD which leakage would cause the HMD to heat up. In other words, the contact points may allow most of the thermal energy to be transferred to the accessory before being absorbed in the HMD. Leakage may be prevented using, e.g., insulation. Such accessories may increase the number of ways an HMD may be used, allowing for a user to switch out accessories according to their comfort, experience and/or power needs. Use of accessories may, for example, allow for a higher quality experience for the user. In some embodiments, it may allow for a longer sustained user experience by allowing for charging and/or use of a battery while utilizing the device. As another example, use of accessories may allow a user to protect their face from the sun while increasing the functioning of the device.

Disclosed systems provide techniques for increasing the TDP of an HMD through use of external components that can be attached to the HMD in certain environments and as needed, e.g., for particular use cases. Furthermore, the disclosed systems allow for a variety of options for accessories to suit the needs, comfort and style of a particular user, which accessories may be switched out as desired and as needed. This technique is available for every type of HMD, regardless of natural capability to reduce heat generation or dispel heat, to cool down in a wide variety of environments, thus optimizing the capabilities of a particular HMD or artificial-reality device. To implement this system, an HMD may be configured with an attachment or contact point to connect to one or more of the optional accessories.

In particular embodiments, a device is in communication with a computing system on the HMD but may be otherwise physically separated from the HMD. As an example and not by way of limitation, this device may be a laptop device that is wired to the HMD or communicates wirelessly with the HMD. As another example and not by way of limitation, the device may be a wearable (e.g., a device strapped to a wrist), handheld device (e.g., a phone), or some other suitable device (e.g., a laptop, a tablet, a desktop, etc.) that is wired to the HMD or communicates wirelessly with the HMD.

In particular embodiments, the thermal energy may be generated by one or more electronic units or components (e.g., CPU, GPU, display etc.) of a computing system associated with a device (e.g., a laptop, a cellphone, a desktop, a wearable device, etc.). The one or more components may be a heat source. In some embodiments, different components may act as heat sources to each other, while in others, the components may be connected wirelessly such that they only heat up that component. As example and not by way of limitation, an onboard computing system of an HMD may be the cause of generation of thermal energy of one or more other devices.

Particular accessories provide users the ability to extend and/or increase their product TDP when they want to do so. In some embodiments, the particular accessories are active accessories, the active accessories possessing components that use or require energy to cool the computer components, such as, e.g., a fan. In other embodiments, the particular accessories are passive accessories, the passive accessories possessing components that cool the computer components without requiring additional energy, such as e.g., a visor or any component that dissipates heat through increased surface area contact with a user's skin and/or the surrounding air. With either active or passive accessories, the result is extension of thermal headroom available for the computing components. In some embodiments, both passive and active accessories may be used. In the same or other embodiments, both passive and active forms of heat dissipation may be used on the same accessory.

Examples of either active or passive accessories include a visor, a docking station, and a headband, each of which may include special (e.g., thermally conductive) contact points to connect with the HMD.

In some embodiments, a body component of an artificial reality device, e.g., the frame of the HMD, is built with a special contact/mount/attachment point for these accessories. These contact points are specifically designed to promote heat spreading from the computing device to the accessory. These contact points are further configured to interface with the special contact points on the accessories themselves. In some embodiments, these contact points may be micro contact points, or contact points which are so small as to be inaccessible to a user's touch. In the same or other embodiments, these contact points may be configured on either or both of the HMD and accessories to have a covering to protect a user from touching exposed contact points when accessories are not being used. Use of such covers may allow for larger contact points to be safely used, which allows for greater heat transfer through the contact points.

In some embodiments, an active heat path control/switch is used to direct heat paths coming from heat sources to either an HMD surface for natural heat dissipation or a contact point for heat dissipation through an accessory. In some embodiments, the heat path is directed to the contact point only when an accessory is detected. As an example and not by way of limitation, some pieces of hardware may be switched on and off manually or automatically in response to feedback. In some embodiments, the feedback may be, e.g., obtained from the contact point.

In some embodiments, an accessory acts as a heat sink to an HMD or AR device. In the same or other embodiments, an accessory dissipates generated and added heat by effectively extending areas of the HMD device and/or the HMD user's body. In another embodiment, heat is stored in a heat storage medium. Furthermore, in some embodiments, an accessory can be used to increase/extend HMD or AR device TDP by either: 1) increasing the heat rejection to the environment air (e.g., passively, by using a larger surface area of the accessory, and/or actively, e.g., by using a fan or a thermoelectric cooler), 2) increasing the HMD or AR device heat rejection to parts of the HMD user's body (e.g., by having contact with extended areas of the HMD user's body and using the user's body as a heat sink), or 3) using phase-change material (or other heat storage techniques) to transfer heat from the HMD or AR device to a heat storage medium for a short duration of time (e.g., during running a use-case with high power demand). The stored heat in the phase-change material (or other heat storage device) in technique No. 3 may be dissipated over a period of time when there is less heat generation on the device.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to an apparatus and a system, wherein any feature mentioned in one claim category, e.g. apparatus, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
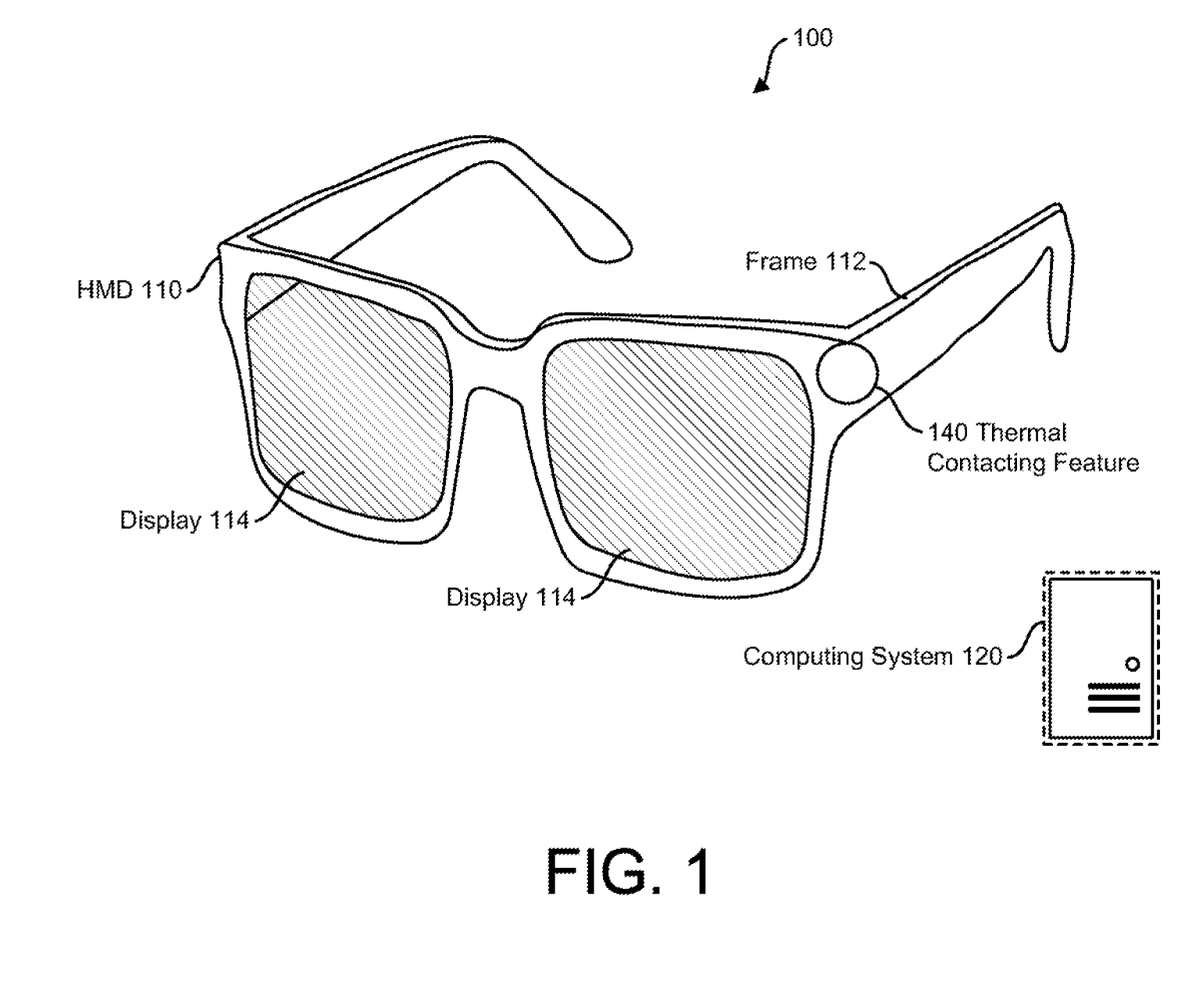
FIG. 1 illustrates an example augmented reality system.

FIG. 1 illustrates an example augmented reality system 100. The augmented reality system 100 may include a head-mounted display (HMD) 110 (e.g., glasses) comprising a frame 112, one or more displays 114, a computing system 120, and one or more thermal contacting features, here called thermal contact points or HMD contact points 140. The HMD contact points 140 on the frame 112 may be specially configured to interface with thermal contact points on accessories designed to store and/or dissipate thermal energy or heat, thus increasing the TDP of the HMD 110. This interfacing may be done in a variety of ways including but not limited to use of magnets and/or indents. As an example and not by way of limitation, the contact points, such as HMD contact points 140, may be made of conductive material, e.g., copper. In some embodiments, the frame 112 may be made of one or any combination of a thermally conductive metal (e.g., magnesium), plastic, or any other suitable material, chosen to either aid in heat dissipation or provide insulation for the user. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and/or videos of environments and/or the user. The HMD 110 may include an eye tracking system to track the vergence movement (as well as other eye movements) of the user wearing the HMD 110. The augmented reality system 100 may further include a controller comprising a trackpad and one or more buttons. By way of example and not by way of limitation, in some embodiments, the controller may be handheld. The controller may receive inputs from the user or users and relay the inputs to the computing system 120. The controller may also provide haptic feedback to the user or users. The computing system 120 may be connected to the HMD 110 and/or the controller through one or any combination of cables or wireless connections. The computing system 120 may control the HMD 110 and/or the controller to provide the augmented reality content to and/or receive inputs from users. The computing system 120 may be a standalone host computer system, an on-board computer system integrated with the HMD 110, a mobile device, or any other hardware platform capable of providing artificial reality content to, and/or receiving inputs from, users.

Users of artificial reality systems may desire to use the artificial reality systems in a variety of locations, each with a different thermal base. For example and not by way of limitation, users may wish to use the artificial reality systems in direct sunlight, meaning that the HMD 110 will also be used in direct sunlight. This may expose the HMD 110 to a higher thermal base. One potential method of thermal energy dissipation uses a fan on different parts of the HMD 110. This method, however, though effective, requires extra power. Thus, use of a passive energy dissipation method, e.g., through an increased surface area, may be desirable in some circumstances.

As further explained in this disclosure, one way to increase thermal budget is to increase the surface area thermally coupled to the HMD 110 through use of one or more device accessories. By implementing device accessories, the artificial reality experience can be improved by, for example, dissipating the thermal energy in an active or passive way using the device accessories. They may further be switched out and/or taken off as needed or when in an environment where the HMD 110's natural device cooling function is sufficient to maintain proper functioning of the device. They may be connected via a thermal contacting feature, such as HMD contact point 140, which may be located on any suitable part of the HMD 110, e.g., at one or both temples, at the ends of frames, and/or at the bridge of the user's nose. Active heat dissipation, such as through use of fans and/or thermoelectric coolers may be effective and desirable in some circumstances. However, active heat dissipation also increases the power requirements of an HMD 110, which may be undesirable in other circumstances due to the small space for power storage. It may also be undesirable in some circumstances because fans increase the noise right next to a user's face. Accordingly, there is an interest in extending the surface area that can be exposed to the air, allowing for passive heat dissipation. Thus, some embodiments described herein allow for passive heat dissipation through accessories configured to interface with an HMD 110. Still, other embodiments use a combination of both passive and active heat dissipation through accessories and/or the HMD 110.

In yet more embodiments, minimal active digital/analog components may be added to an accessory (e.g., platform thermal sensors) which allow a computing device to include accessory temperature in thermal management. For example, such components may monitor temperature of the accessory surface areas in contact with the user and enforce skin/surface limits on these surfaces. In some embodiments there may be digital/analog interface(s) between the accessory and an AR device to communicate data (e.g., sensed temperature and/or control signals) between them. In some embodiments, this interface may be wired (through physical pins/contact). In some embodiments, this communication may be done wirelessly. An exchange of data between the accessory and AR device can be used for identification of the accessory by the AR device (e.g., accessory type, model, capability, etc.) instead of or in addition to communication of telemetry (e.g., sensed temperature) and control information between the accessory and the AR device.

In another embodiment, a temperature associated with an accessory relative to an HMD 110 or other AR device may be used to control thermal conduction/contact between the accessory and a computing device. This has the advantage of increasing the ability to limit or prevent the accessory from heating up the HMD 110 if the accessory is or becomes hotter than HMD 110. This may account for the possibility that the accessory is hotter than the HMD 110 and change heat paths accordingly. As an example and not by way of limitation, the HMD 110 may include a temperature sensor to allow for this control. In cases where the accessory uses phase-change material for heat storage, this control is helpful in stopping heat transfer to the phase-change material when heat storage capacity is reached and further allowing the gradual dissipation of heat for this material. In some embodiments, this gradual dissipation is achieved using an active electrical/magnetic contact, which electrically controls the amount of thermal contact between the device and the accessory, providing high thermal contact when the accessory is colder and acting as a heat sink with low thermal contact (e.g., air gaps) when the accessory is hotter than the HMD 110. In other embodiments, this gradual dissipation is achieved passively using, e.g., bimetallic strips which engage as long as temperature is below a certain threshold.

In another embodiment, an accessory may include a mechanism for active cooling, such as one or more fans. This may be desirable, for example, in a particularly hot environment or when a user is exposed to sunlight for long periods of time while using the HMD 110.

In yet another embodiment, one or more accessories may use a vapor-liquid two phase heat transfer mechanism, including but not limited to, e.g., vapor chambers, thermal ground planes, and a heat pipe for faster transfer of heat to the HMD surface and/or from the HMD 110 to the one or more accessories. Such a heat pipe may use two phases of heat transfer and a high effective thermal conductivity to transfer this heat between the solid interfaces. In some embodiments, one or more accessories may use a passive but highly conductive material, e.g., synthetic graphite.

In some embodiments, an accessory may include a visor with a special chassis/frame which can mount on the HMD 110. Such a visor may serve multiple functions, for example, it may block the sun from a user's face, reduce solar load on HMD 110 and/or computing system 120, and act as a heatsink for HMD 110 and/or computing system 120. A visor may, for example, dissipate heat using one method through its large surface area and/or using another method through increasing contact with the user's skin. In other embodiments, an accessory may include a cap or hat, over-the-ear headphones or ear warmers, clip-on shades (on the front of HMD 110), or clip-on heat storage cartridges on frame 112. In another embodiment, an accessory may be a passive HMD 110 dock (passive dock without charging capabilities of chip), which may serve dual functions: to hold HMD 110 and/or the computing system 120 (which in some embodiments may accompany the HMD 110 but not be worn on the face) in the position desired by the user and to act as a heatsink for computing system 120. The passive HMD 110 dock may be able to dissipate heat using any of the methods described above, in particular the method of increased surface area exposed to air. Similarly, in an embodiment, an accessory may be an active HMD 110 dock, which may serve triple functions: to hold HMD 110 in the position desired by the user, to act as a heatsink with active cooling (e.g., using a fan), and to charge the computing system 120.

In some embodiments, an accessory may include a headband with heat conductive contact, e.g., through inclusion of accessory contact points, with HMD 110 and specially designed outer material to promote fast heat transfer with air. Furthermore, the headband could utilize specially-designed headband internal material (e.g., the material that is in contact with the user's head) to promote heat transfer to larger areas of the user's head. Additionally or alternatively, the headband can include phase-change material to use the method described above.

In some embodiments, an accessory may include a sport strap, connecting the frame arms from the back of the user's head to prevent HMD 110 from falling off during sport activities. The sport strap can include special outer surface structure to promote heat dissipation. Additionally or alternatively, the sport strap can include special inner surface material, designed or selected to promote heat dissipation to the user's head. Additionally or alternatively, the sport strap can include special phase-change material to promote short-term heat absorption, e.g., when a large amount of heat is generated in a short amount of time, from HMD 110 and gradual heat dissipation during device idle time. Additionally or alternatively, the accessory may include designed external service properties to minimize absorption or maximize radiative heat rejection.

As a highlight enhancement, which may be added to any of the above embodiments, a physical contact point between an accessory and HMD 110/computing system 120 can be electronically and/or magnetically controlled. In the same or other embodiments, the physical contact point may be a mechanical interface/interlock. In some embodiments, the physical contact point, or a component associated with the physical contact point, may act as a control, which control may cause there to be heat conductive contact when the accessory serves as a heat sink to HMD 110/computing system 120 and not have heat conductive contact when the accessory would heat up HMD 110/computing system 120 (e.g., when a visor frame is hotter than HMD 110). Similarly, as discussed above, the control may be done passively through a bimetallic strip that engages as long as temperature is below a threshold and then stops when that threshold is reached or exceeded.

Additionally or alternatively, as a highlight enhancement, which may be added to any of the above embodiments, one or more digital/analog temperature sensors may be added to the accessory, and temperature data received from these temperature sensors may be communicated to HMD 110/computing system 120 for use in runtime thermal management.

Figure 2:
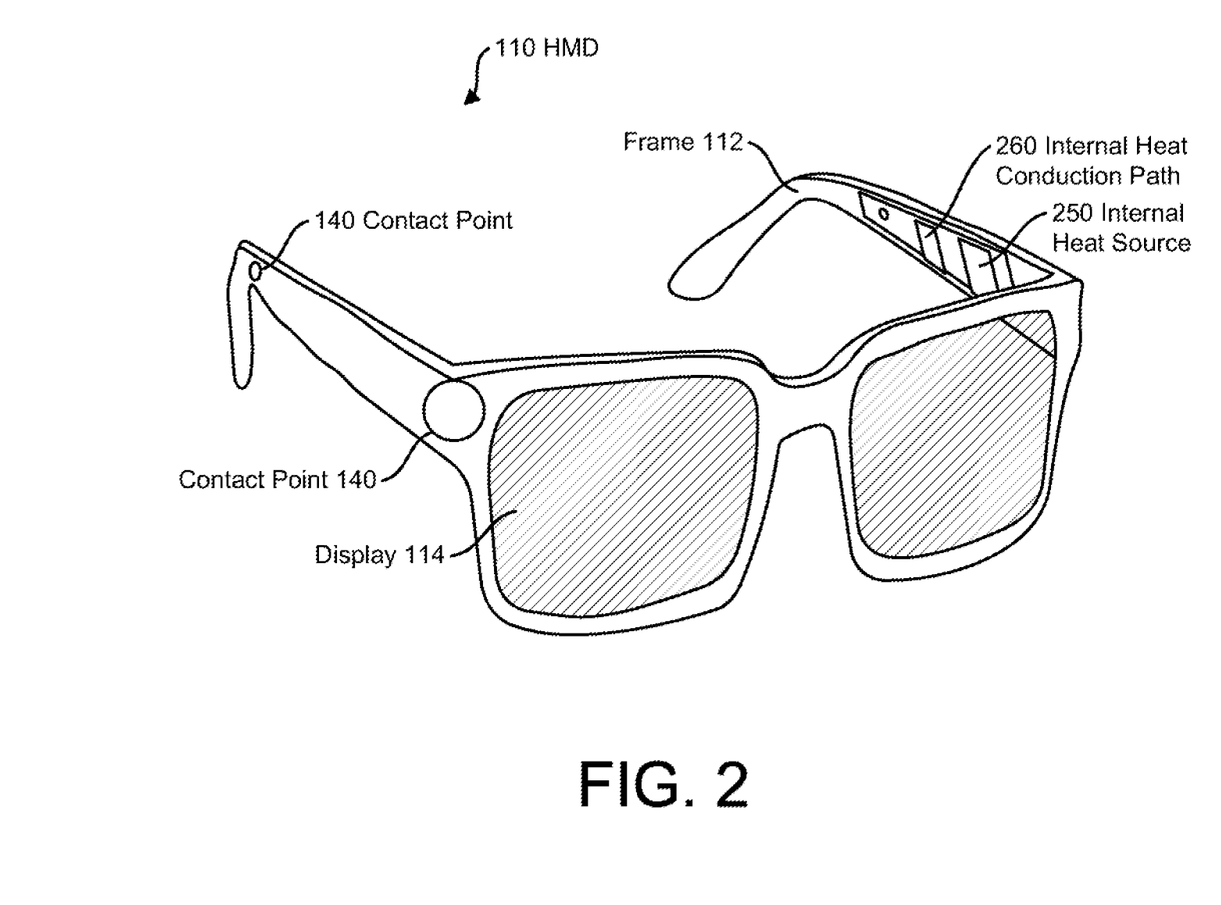
FIG. 2 illustrates an example head mounted display (HMD) with a one or more contact points.

FIG. 2 illustrates an example head mounted display (HMD) 110 with one or more HMD contact points 140. The HMD 110 may have a frame 112 with a display 114. As an example and not by way of limitation, the one or more HMD contact points 140 may be located on arms of the HMD 110. In some embodiments, the one or more HMD contact points 140 may be small indentations on an outer surface of the frame 112 of the HMD 110. In some embodiments, there may be an internal heat conduction path 260 along an internal portion of the HMD 110, as illustrated in FIG. 2, e.g., inside of the frame 112. In some embodiments, there may be an internal heat source 250, e.g., a computing device, either inside or on an inner surface of the frame 112. In some embodiments, there may be more than one internal heat source 250 on the frame 112 or elsewhere on the HMD 110.

In some embodiments, the internal heat source(s) 250 may have a higher power budget when an accessory is attached to the HMD 110, e.g., through one or more HMD contact points 140. This is because for comfort, reliability and compliance reasons, it may be desirable and/or necessary for the frame 112 to maintain a temperature below a threshold value which may be possible despite increased energy generation when the accessory is attached. Attaching an accessory may also maximize heat dissipation capability of the HMD 110 and allow for more power consumption and potentially hotter internal components while keeping the surface of the HMD 110 or other wearable device or product cool. In some embodiments, this is achieved by intentionally directing internal heat transfer paths of the HMD 110 toward the HMD contact point(s) 140. The intentional directing or changing of internal heat transfer paths may, in some embodiments, be achieved passively using, e.g., material properties, and, in the same or other embodiments, be achieved actively using, e.g., electromechanical switching. When an accessory is not connected, the heat dissipation capability, and therefore the power budget, will be the native AR budget, and the internal portion of the HMD 110 will be hotter than the surface of the HMD 110.

Figure 3:
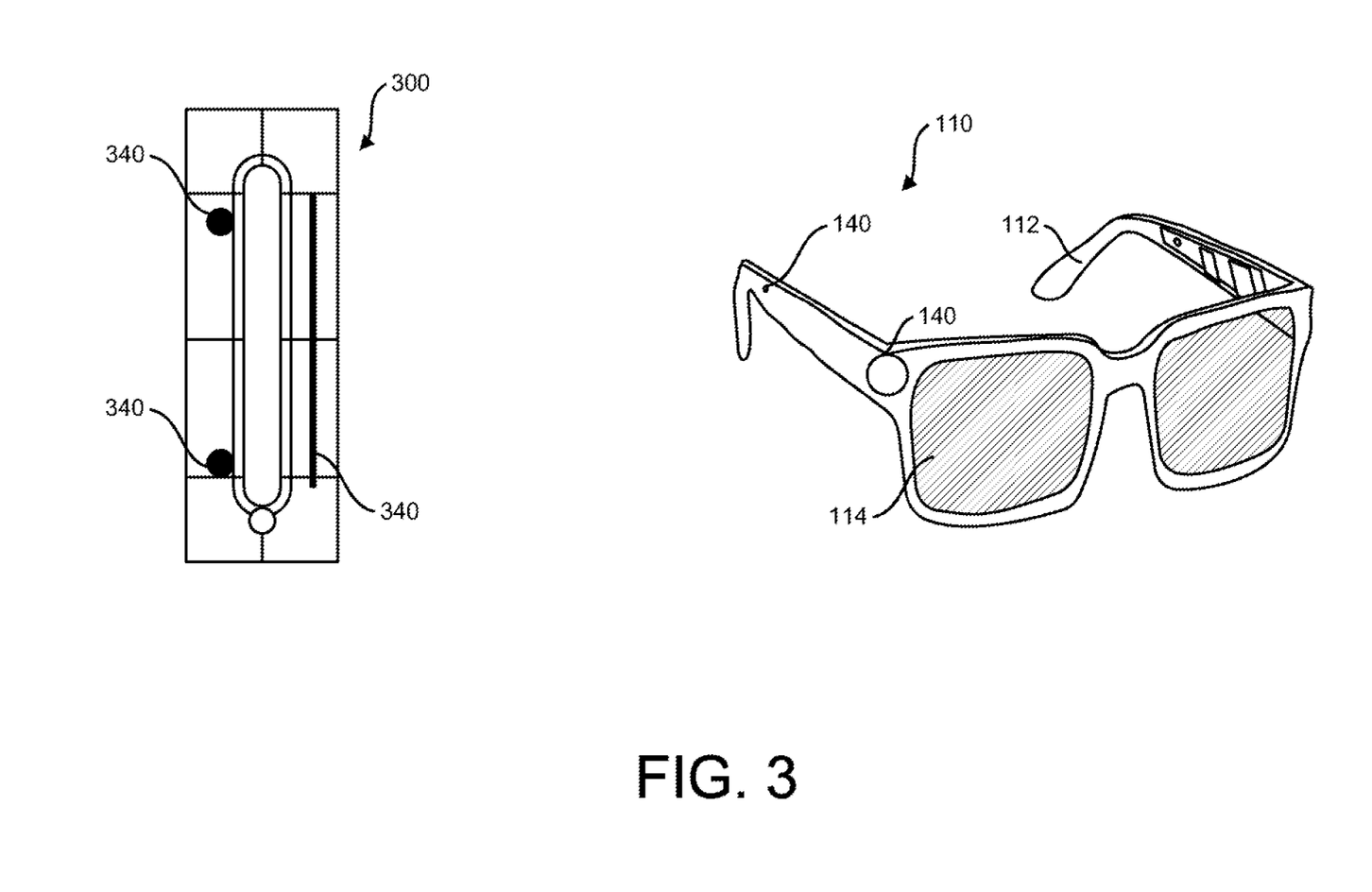
FIG. 3 illustrates an example HMD and an accessory, each with respective contact points.

FIG. 3 illustrates two AR device components, an HMD 110, and a compute device 300, each with respective contact points. The HMD 110 may have a frame 112 with a display 114. As an example and not by way of limitation, one or more HMD contact points 140 may be located on arms of the HMD 110. In some embodiments, the one or more HMD contact points 140 may be small indentations on an outer surface of the frame 112 of the HMD 110. In some embodiments, the one or more HMD contact points 140 may be configured to connect with an accessory. In some embodiments, the HMD contact points 140 may be specially configured to connect to a particular external accessory. In other embodiments, the HMD contact points 140 may be configured to connect to a variety of external accessories. The ability to connect to a variety of external accessories allows for flexibility and the use of different devices for different use cases. As an example and not by way of limitation, this may allow for use of a visor in the sun or a fan when a large amount of power is required, such as for streaming.

In some embodiments, the AR compute device 300 may include one or more accessory contact points 340. As an example and not by way of limitation, the one or more accessory contact points may include circular indents and/or a long indent on the outside of the external accessory. As an example and not by way of limitation, the AR compute device 300 may be a "stage" component of a 2-part AR device which includes a stage, e.g., a smartphone or smartphone-like compute device.

As an example and not by way of limitation, a heat path may be insulated between a heat source in an AR device and a contact point on the AR device to prevent heat from being absorbed within the AR device or HMD 110. Essentially, the insulation may help re-direct heat to an accessory, thus rejecting the heat out of the AR device with reduced or minimal "leakage" of heat into the AR device. In some embodiments, thermal isolation material may be used to insulate the heat path or heat channel. This may, e.g., allow the heat channel to reach temperatures higher relative to the surface of the AR device. This, in turn, allows the HMD 110 to be cool against the user's skin. At the same time, the HMD contact point and/or the accessory contact point can reach temperatures above thermal design limits. Examples of materials that may be used for HMD 110 include graphite, copper, and other conductive materials, to spread heat. Examples of materials that may be used for insulation include air gaps and aero gel.

Figure 4:
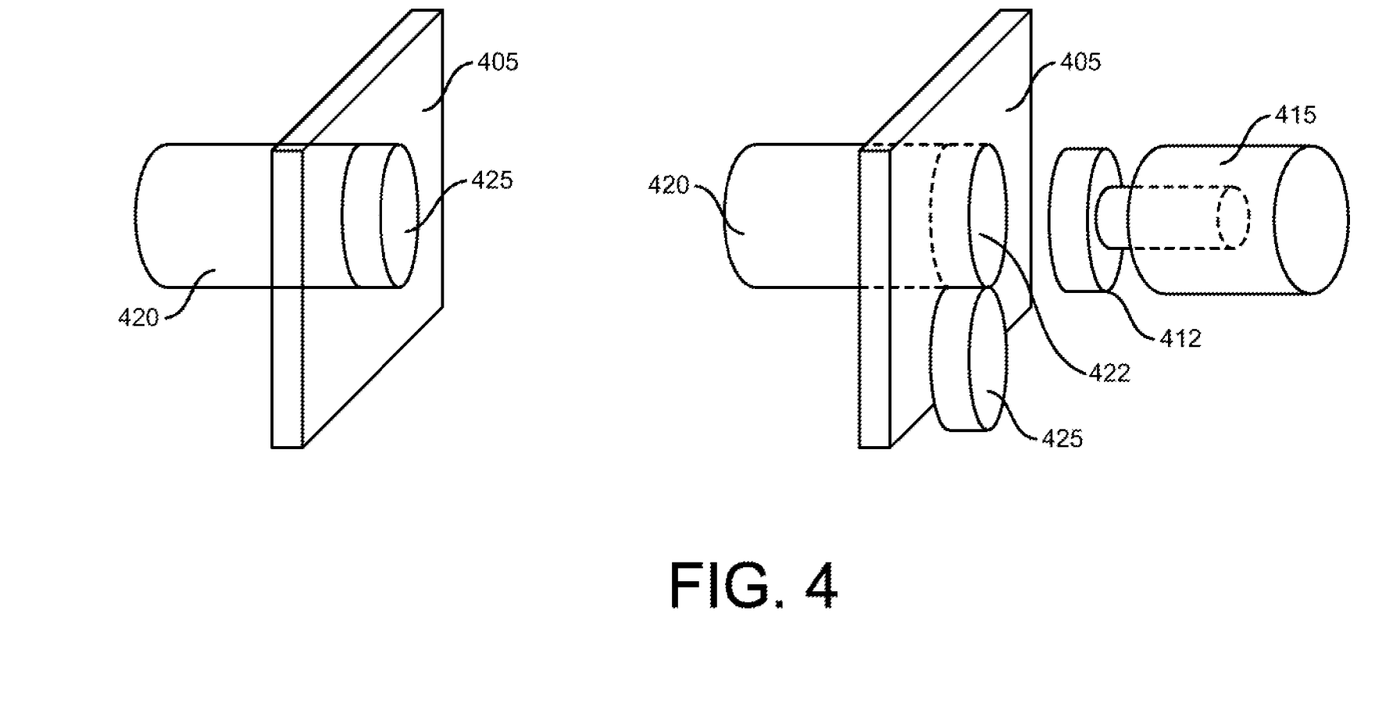
FIG. 4 illustrates an example of contact point touch prevention mechanisms for each of an HMD contact point and an accessory contact point.

FIG. 4 illustrates an example of contact point touch prevention mechanisms for each of an HMD contact point 422 and an accessory contact point 412. In some embodiments, an HMD surface 405 may have one or more HMD contact points 422. In some embodiments, there may be a heat path internal to the product 420 that extends to the HMD surface 405 or to an attached accessory through the HMD contact point 422. In particular embodiments, an HMD contact point cover 425 may be attached to the HMD contact point 422 and/or the HMD surface 405. The HMD contact point cover 425 may be configured such that it can cover the surface of the HMD contact point 422 when an accessory is not connected. This may protect a user from feeling discomfort as a result of touching an HMD contact point 422, allowing the use of a larger thermal contact point while establishing extra safety precautions. In some embodiments, the contact points may be indented and small enough to not be touchable. In the same or other embodiments, one or more of the contact points may be made of two or more small indentations close together so as to prevent a user from being able to touch those indentations, which may be particularly hot. Additionally or alternatively, in some embodiments, the accessory contact point 412 may be located on a portion of an accessory The accessory may include an accessory contact point cover 415 to protect a user from being burned by the accessory contact point 412.

Figure 5:
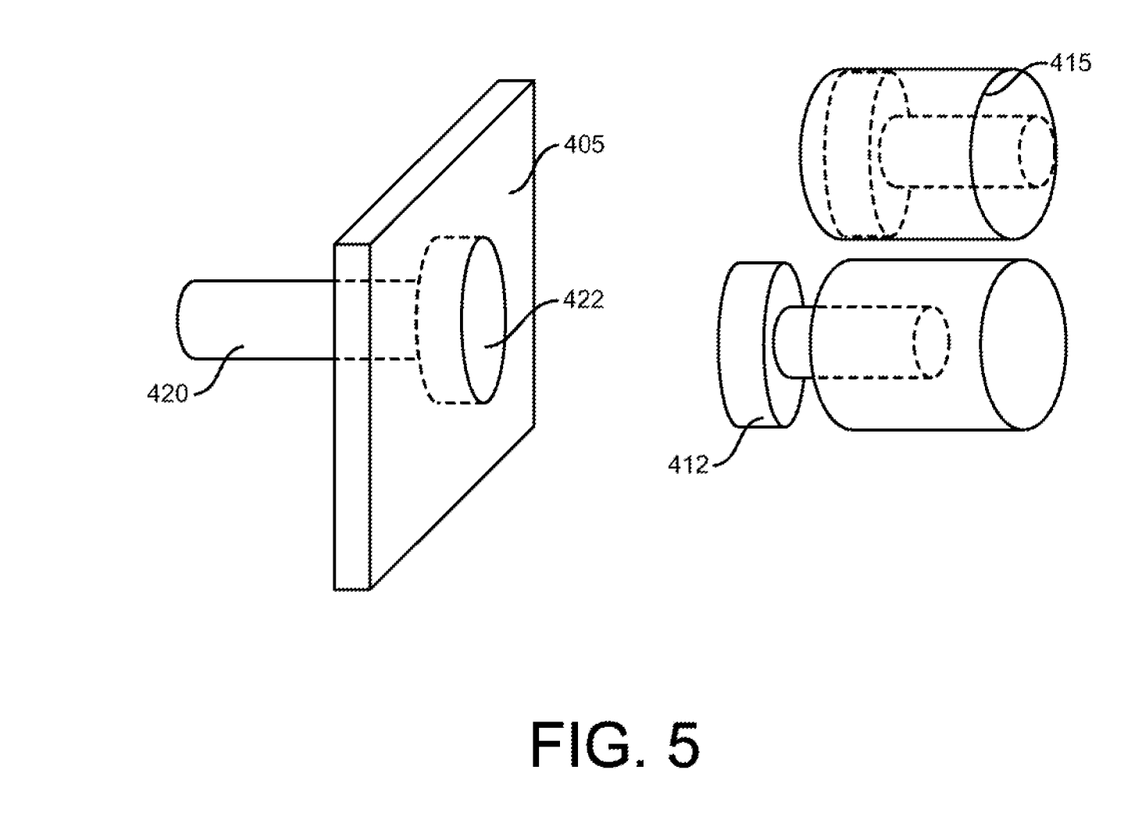
FIG. 5 illustrates another example of a contact point prevention mechanism for an accessory contact point.

FIG. 5 illustrates another example of a contact point prevention mechanism for an accessory contact point. As an example and not by way of limitation, in some embodiments there is a heat path internal to the product 420 that extends to an HMD surface 405. In some embodiments, the HMD surface 405 may have an HMD contact point 422. As an example and not by way of limitation, the HMD contact point 422 may be insulated from the rest of HMD surface 405. This may allow the heat to be directed specifically to an accessory rather than generally to the HMD surface 405. Among other advantages, such as allowing the use of an external accessory for broader and/or faster heat dissipation, this can increase the safety to an individual by redirecting the heat from a portion of the HMD that a user might touch to the HMD contact point 422 that may be more easily avoided. Similarly, in some embodiments, there may be an accessory contact point 412, which is configured to connect to the HMD contact point 422. As an example and not by way of limitation, in some embodiments, an accessory contact point cover 415 may be included to further protect the user from touching the accessory contact point 412, which may be hot after being connected to the HMD contact point 422 and receiving thermal energy directed from the HMD.

Figure 6:
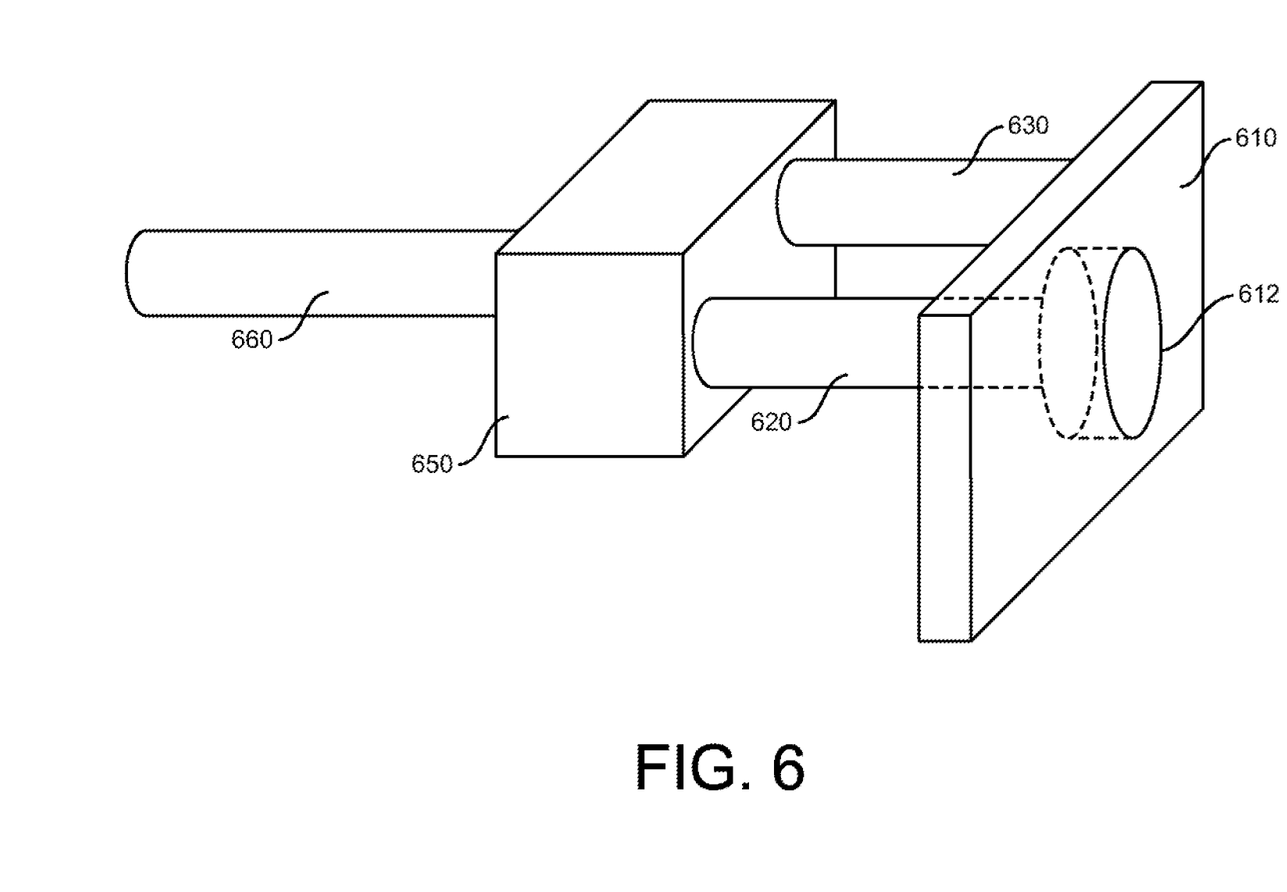
FIG. 6 illustrates an example contact point design with an active heat path control/switch.

FIG. 6 illustrates an example contact point design with an active heat path control/switch 650. In some embodiments, as illustrated by FIG. 6, there may be more than one heat path in a product, which heat paths may be determined by the active heat path control/switch 650. The active heat path control/switch 650, which may be, e.g., a thermal diode or other suitable technology capable of altering heat paths, is used to control internal heat conduction from active components to a device (e.g., HMD) surface generally, e.g., when an accessory is not connected, and contact points on that surface, e.g., when an accessory is connected. The active heat path control/switch 650 may, additionally or alternatively, control internal product heat conduction based on type of accessory and/or number of contact points. As explained above, in some embodiments the switch may receive temperature data and have the capability of using that temperature data to reroute heat to other HMD contact points 612, e.g., if one portion of the HMD is hotter than another and there is need to spread the heat more evenly across the HMD. In some embodiments, the temperature data may be used to determine if an accessory is hotter than the HMD, and if so, reroute heat to an HMD surface 610 rather than HMD contact points 612 to prevent the accessory from heating up the HMD and/or maximize heat dissipation. In some embodiments, there may be a heat path from internal product heat sources 660. By way of example and not by way of limitation, the internal product heat source may be a main power source for an HMD, e.g., a battery and/or a computing device. In some embodiments, the active heat path control/switch 650 may be configured to be able to direct heat to either or both of an HMD surface 610 itself or an HMD contact point 612 on the HMD surface 610, depending on the circumstances. As an example and not by way of limitation, as illustrated schematically in FIG. 6, the active heat path control/switch 650 may have two options, e.g., a surface heat path 630 and a contact point heat path 620. As an example, the active heat path control/switch 650 may direct heat to the HMD surface 610 through the surface heat path 630 when it detects that no accessory is attached to the HMD or when it detects that an accessory is hotter than the HMD. Additionally or alternatively, the active heat path control/switch 650 may direct heat to the HMD contact point 612 through the contact point heat path 620 when it detects that an accessory is attached to the HMD or when it detects that an accessory has cooled down to a temperature lower than the HMD. In various embodiments, there may be multiple surface heat paths 630 and/or contact point heat paths 620 that may be controlled together or separately by one or more active heat path controls/switches 650.

In some embodiments, the active heat path control/switch 650 is programmed to automatically switch a heat path from the surface heat path 630 to the contact point heat path 620 when it detects that an accessory is attached to the HMD contact point 612. Similarly, in the same or other embodiments, the active heat path control/switch 650 is programmed to automatically switch a heat path between different contact point heat paths 620 when it detects which HMD contact point 612 one or more accessories are attached to. It may be desirable to maintain the surface heat path 630 when an accessory is not being used to maximize natural heat dissipation to the environment through the greater surface area of the HMD surface 610. It may also be desirable to maintain the surface heat path 630 when the accessory is hotter than the HMD. As an example and not by way of limitation, the contact point path 620 may be selected using the switch which may be a thermal diode. Additionally or alternatively, the surface heat path may be a native heat path which can create a controlled and/or balanced heat distribution. In some embodiments, both the contact point heat path and the surface heat path are activated at the same time, with a percentage of the heat path being directed to the accessory and another percentage directed to the native surface for dissipation. As an example and not by way of limitation, in some embodiments, some hardware components might only turn on if there is an accessory and/or others may always be on.

In some embodiments, there may be more than one of the described HMD contact points 612. In such an embodiment, as an example and not by way of limitation, each of the HMD contact points 612 may be capable of being controlled separately. The capability to independently control multiple thermal contact points 612 can be used to reduce non-uniform distribution of temperature over a product. For example, in the context of an AR glasses form factor device with two temple arms, there may be a thermal HMD contact point 612 for an accessory on both left and right-side temple arms. In such a case, if a thermal management framework, which may include, e.g., a heat sensor, detects that one temple arm is getting hotter than the other temple arm (e.g., due to higher power consumption from electronics on one side, or due to solar load exposure on one side), then thermal contact of each of the left and the right side temple arms could be set differently to promote higher heat extraction from the side getting hotter and prevent that side from reaching or passing a thermal limit earlier than the other side.

Figure 7:
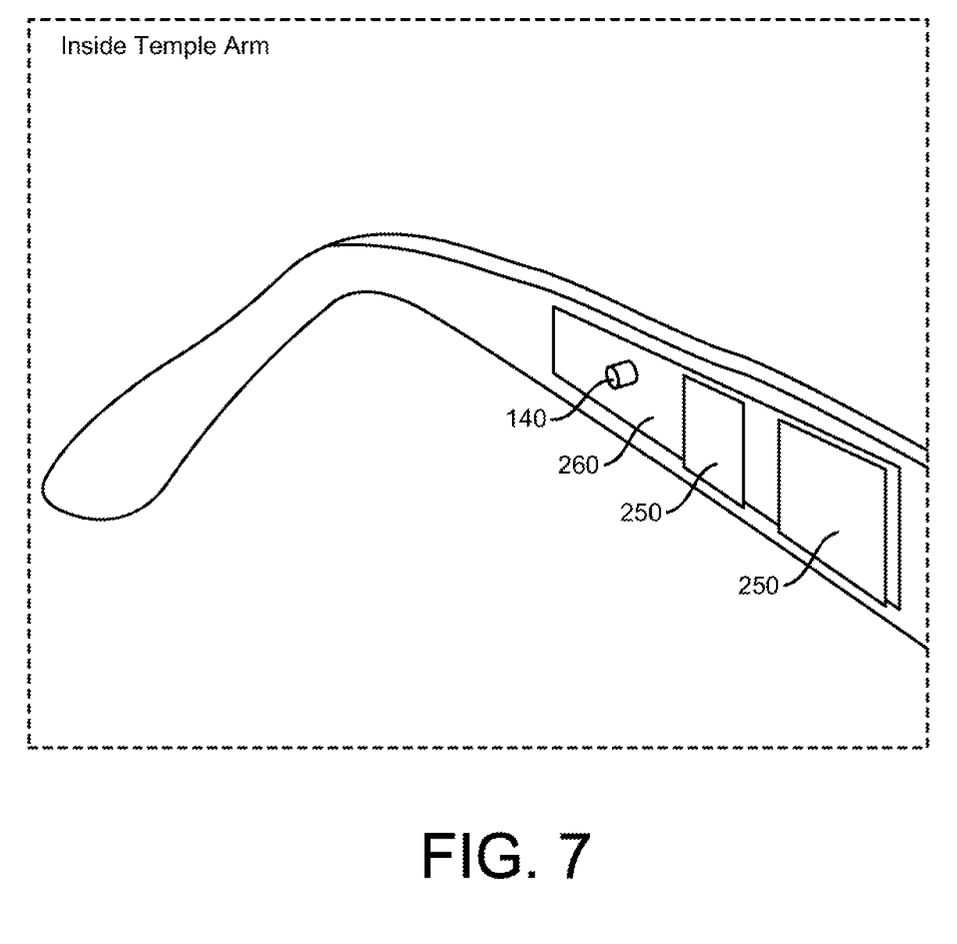
FIG. 7 illustrates an example of an internal view of a heat path and contact points on a portion of an HMD.

FIG. 7 illustrates an example of an internal view of a heat path and contact points on a portion of an HMD. As an example and not by way of limitation, FIG. 7 illustrates such a heat path and a contact point on the inside of a temple arm, which heat path may be internal to the temple arm (i.e., not on the surface) such that it is not in contact with a user's face while the contact point may be on the outer surface of the inside portion of the temple arm such that it can come into contact with contact points from an accessory. The contact point may be As an example and not by way of limitation, as illustrated in FIG. 7, there may be one or more HMD contact points 140. In some embodiments, there may be one or more internal heat conduction paths 260, which may be one of a variety of shapes and/or materials and/or one or more internal heat sources 250. As an example and not by limitation, the internal heat conduction paths 260 may also be a thermal conductor, which thermal conductor refers to a component coupled between internal heat sources 250 and HMD contact points 140 in order to enable one or more heat paths. The one or more internal heat sources 250 may be one or more of a variety of shapes and materials and/or in a variety of locations on the HMD.

Figure 8:
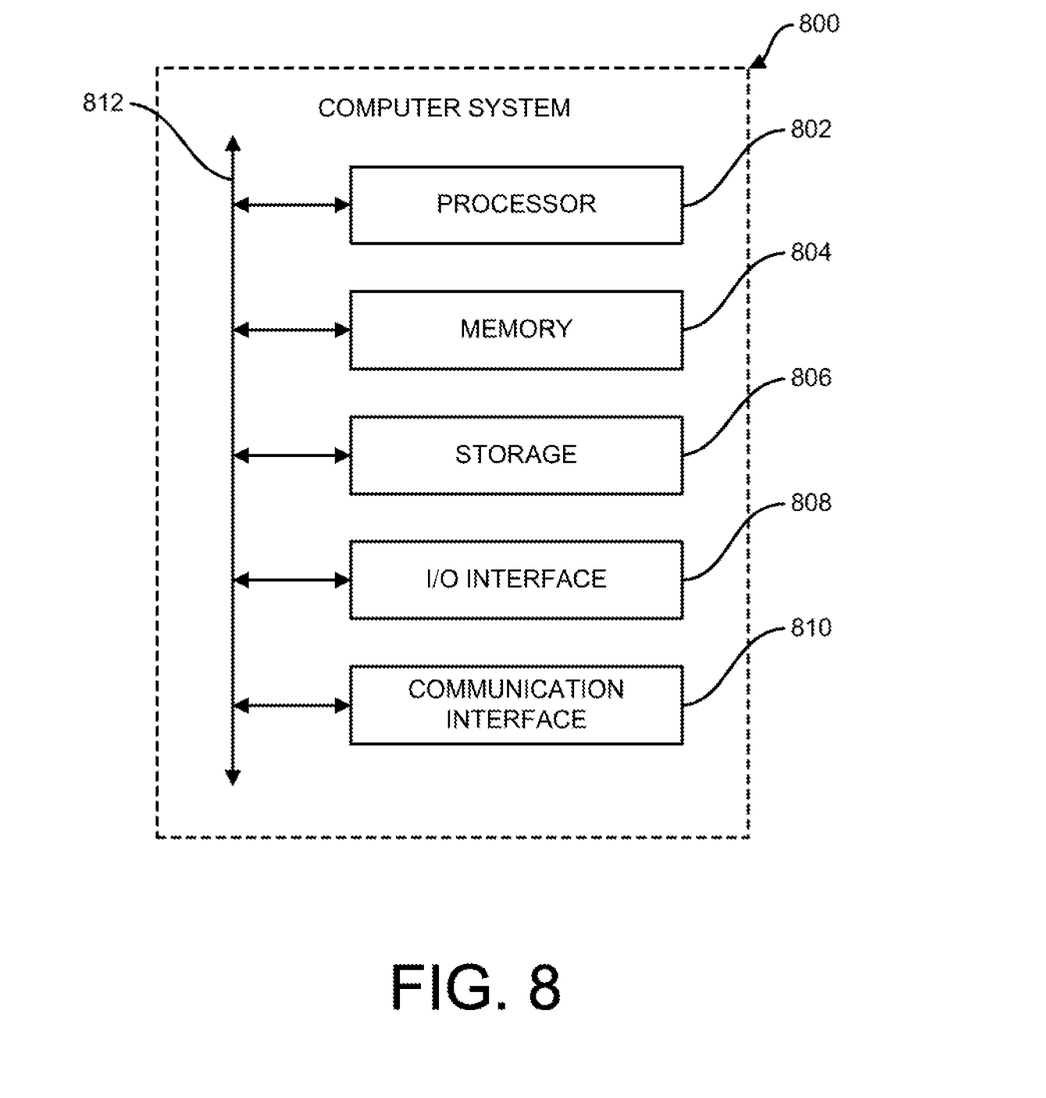
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An artificial reality device comprising:
    a body component configured to enable a visual associated with an artificial reality program to be presented to a user;
    an electronic unit embedded within the body component;
    a thermal conductor embedded within the body component, wherein the thermal conductor is thermally coupled to the electronic unit, and the thermal conductor is thermally coupled to the body component via a first heat path;
    a first thermal contact point on the body component with an external surface and an internal surface, wherein the internal surface is thermally coupled to the thermal conductor via a second heat path, and the external surface is thermally coupled to the internal surface of the first thermal contact point; and
    a switch configured to selectively permit a portion of thermal energy from the electronic unit to be directed to:
        (i) the first thermal contact point via the second heat path of the thermal conductor in response to physical contact with the first thermal contact point, and
        (ii) the body component via the first heat path of the thermal conductor in response to absence of physical contact with the first thermal contact point.

2. The artificial reality device of claim 1, wherein the first thermal contact point is located on an outside portion of the body component.

3. The artificial reality device of claim 1, further comprising a total number of contact points, wherein the total number is at least two, wherein the switch is further configured to: determine physical contact with a number less than the total number of contact points, and if physical contact is determined to be a number less than the total number of contact points, to activate a heat path to only the contact points with physical contact.

4. The artificial reality device of claim 1, wherein the switch is configured to allow a first portion of thermal energy to be directed through the first thermal contact point and a second portion of thermal energy to be directed to the first heat path.

5. The artificial reality device of claim 1, further comprising a temperature sensor to determine a temperature of at least one of the artificial reality device.

6. The artificial reality device of claim 1, further comprising insulation, wherein the insulation is configured to promote one or more of: uniform dissipation of heat throughout a general surface of the body component and directed dissipation of heat through the first thermal contact point.

7. The artificial reality device of claim 1, further comprising a contact point cover, wherein the contact point cover is configured to shield the first thermal contact point.

8. The artificial reality device of claim 6, wherein the contact point cover is configured to remain attached to the artificial reality device but not over the first thermal contact point.

9. The artificial reality device of claim 1, wherein the first thermal contact point comprises a plurality of micro contact points.

10. The artificial reality device of claim 1, wherein the first thermal contact point is indented.

11. The artificial reality device of claim 1, wherein the first thermal contact point includes a magnet.

12. The artificial reality device of claim 1, wherein the artificial reality device is configured to accept data from the first thermal contact point.

13. The artificial reality device of claim 1, wherein some hardware components associated with the artificial reality device are configured to turn on in response to contact with the first thermal contact point.

14. The artificial reality device of claim 1, wherein the first thermal contact point is configured to selectively contact an accessory contact point.

15. A method comprising:
directing a portion of thermal energy from an electronic unit via a thermal conductor thermally coupled to the electronic unit, wherein the electronic unit and the thermal conductor are each embedded within a body component, and the body component is configured to enable a visual associated with an artificial reality program to be presented to a user;
selectively permitting the portion of the thermal energy from the electronic unit to be directed to:
(i) the body component via a first heat path of the thermal conductor thermally coupled to the body component in response to absence of physical contact with the first thermal contact point; and
(ii) a first thermal contact point via a second heat path of the thermal conductor thermally coupled to the first thermal contact point in response to physical contact with the first thermal contact point, wherein the first thermal contact point is disposed on the body component.

16. The method of claim 15, wherein an internal surface of the first thermal contact point is thermally coupled to an external surface of the first thermal contact point.

17. The method of claim 15, wherein the first thermal contact point is located on an outside portion of the body component.

18. The method of claim 15, the method further comprising:
determining physical contact with a number of contact points less than a total number of contact points; and
activating a heat path only to the contact points with physical contact in response to determining physical contact with the number of contact points less than the total number of contact points.

19. The method of claim 15, the method further comprising:
directing a first portion of thermal energy through the first thermal contact point; and
directing a second portion of thermal energy to the first heat path.

20. The method of claim 15, the method further comprising:
determining a temperature of at least one of the artificial reality device via a temperature sensor.

* * * * *